(12) United States Patent
Cuche et al.

(10) Patent No.: US 11,340,438 B2
(45) Date of Patent: May 24, 2022

(54) FIBER SPLITTER DEVICE FOR DIGITAL HOLOGRAPHIC IMAGING AND INTERFEROMETRY AND OPTICAL SYSTEM COMPRISING SAID FIBER SPLITTER DEVICE

(71) Applicant: LYNCEE TEC SA, Lausanne (CH)

(72) Inventors: Etienne Cuche, Lausanne (CH); Yves Emery, Lausanne (CH)

(73) Assignee: LYNCEE TEC SA, Lausanne (CH)

( * ) Notice: Subject to any disclaimer, the term of this patent is extended or adjusted under 35 U.S.C. 154(b) by 335 days.

(21) Appl. No.: 16/343,229

(22) PCT Filed: Oct. 25, 2016

(86) PCT No.: PCT/IB2016/056408
§ 371 (c)(1),
(2) Date: Apr. 18, 2019

(87) PCT Pub. No.: WO2018/078417
PCT Pub. Date: May 3, 2018

(65) Prior Publication Data
US 2019/0250392 A1   Aug. 15, 2019

(51) Int. Cl.
*G02B 21/14*    (2006.01)
*G03H 1/04*     (2006.01)
(Continued)

(52) U.S. Cl.
CPC ............ *G02B 21/14* (2013.01); *G01B 9/021* (2013.01); *G01B 9/02007* (2013.01);
(Continued)

(58) Field of Classification Search
CPC ........... G03H 1/0005; G03H 2001/005; G03H 2223/16; G03H 2223/26; G01B 9/021
See application file for complete search history.

(56) References Cited

U.S. PATENT DOCUMENTS 3,598,467 A * 8/1971 Pearson ................... G02B 6/06
                                                             359/27
3,729,249 A   4/1973 Habegger et al.
(Continued)

FOREIGN PATENT DOCUMENTS

CN   201974574 U  *  9/2011  ........... G03H 1/0443
EP       1119798 B1     3/2005
(Continued)

OTHER PUBLICATIONS

Kemper, Björn, et al., "Modular digital holographic microscopy system for marker free quantitative phase contrast imaging of living cells," Biophotonicsand New Therapy Frontiers, Proceedings of SPIE, vol. 6191, Apr. 2006, pp. 61910T-1-61910T-8.
(Continued)

*Primary Examiner* — Michael A Lyons
(74) *Attorney, Agent, or Firm* — Nixon & Vanderhye P.C.

(57) ABSTRACT

An optical fiber splitter device comprising at least two optical fibers of different lengths is disclosed for partial or complete compensation of the optical path difference between waves interfering to generate a hologram or an interferogram. Various implementations of this fiber splitter device are described in apparatuses for holographic and interferometric imaging of microscopic and larger samples.

19 Claims, 7 Drawing Sheets

(51) Int. Cl.

| | | |
|---|---|---|
| *G02B 21/06* | (2006.01) | |
| *G01B 9/02091* | (2022.01) | |
| *G01B 9/02015* | (2022.01) | |
| *G01B 9/02001* | (2022.01) | |
| *G01B 9/021* | (2006.01) | |
| *G01N 21/45* | (2006.01) | |
| *G02B 27/14* | (2006.01) | |
| *G03H 1/00* | (2006.01) | |
| *G02B 27/10* | (2006.01) | |
| *G01N 21/41* | (2006.01) | |

(52) U.S. Cl.
CPC ..... *G01B 9/02028* (2013.01); *G01B 9/02091* (2013.01); *G01N 21/453* (2013.01); *G02B 21/06* (2013.01); *G02B 27/14* (2013.01); *G03H 1/0005* (2013.01); *G03H 1/041* (2013.01); *G03H 1/0443* (2013.01); *G03H 1/0465* (2013.01); *G01B 2290/70* (2013.01); *G01N 2021/4186* (2013.01); *G01N 2021/458* (2013.01); *G01N 2201/082* (2013.01); *G01N 2201/0846* (2013.01); *G02B 27/10* (2013.01); *G03H 2001/005* (2013.01); *G03H 2001/0452* (2013.01); *G03H 2001/0456* (2013.01); *G03H 2001/0469* (2013.01); *G03H 2001/0471* (2013.01); *G03H 2223/16* (2013.01); *G03H 2223/24* (2013.01); *G03H 2223/26* (2013.01)

(56) References Cited

U.S. PATENT DOCUMENTS

| | | |
|---|---|---|
| 4,213,193 A | 7/1980 | Reid et al. |
| 5,633,715 A | 5/1997 | Ai et al. |
| 7,649,160 B2 | 1/2010 | Colomb et al. |
| 2008/0265130 A1 | 10/2008 | Colomb et al. |
| 2014/0267597 A1 | 9/2014 | Yu |
| 2015/0008339 A1 | 1/2015 | French et al. |
| 2016/0252880 A1 | 9/2016 | Sánchez Ortiga et al. |
| 2016/0266356 A1* | 9/2016 | Hashimoto ........ G02B 27/0025 |
| 2017/0003650 A1* | 1/2017 | Moser ................... G03H 1/041 |

FOREIGN PATENT DOCUMENTS

| | | |
|---|---|---|
| JP | S54-17047 A | 2/1979 |
| JP | H3-80636 A | 4/1991 |
| JP | 2000-18911 A | 1/2000 |
| JP | 2004-503812 A | 2/2004 |
| JP | 2007-151631 A | 6/2007 |
| JP | 2014-149190 A | 8/2014 |
| JP | 2014-224801 A | 12/2014 |
| WO | 01/96916 A2 | 12/2001 |
| WO | 2009/148407 | 12/2009 |
| WO | 2015/189174 A2 | 12/2015 |

OTHER PUBLICATIONS

Weijuan, Qu, et al., "Microlens characterization by digital holographic microscopy with physical spherical phase compensation," Applied Optics, vol. 49, No. 33, Nov. 30, 2010, pp. 6448-6454.

Communication pursuant to Article 94(3) dated Jul. 7, 2020, issued in European Application No. 16805893.1, 5 pages.

Notice of Reasons for Rejection dated Sep. 23, 2020, issued in Japan Patent Application No. 2019-0542814 and English translation, 11 pages.

International Search Report for PCT/IB2016/056408, dated Jun. 7, 2017, 5 pages.

Written Opinion of the ISA for PCT/IB2016/056408, dated Jun. 7, 2017, 8 pages.

Kuhn et al., "Real-time dual-wavelength digital holographic microscopy with a single hologram acquisition", Optics Express, vol. 15, No. 12, May 29, 2007, pp. 7231-7242.

Hillmann et al., "Efficient holoscopy image reconstruction", Optics Express, vol. 20, No. 19, Sep. 10, 2012, pp. 21247-21263.

* cited by examiner

FIBER SPLITTER DEVICE FOR DIGITAL HOLOGRAPHIC IMAGING AND INTERFEROMETRY AND OPTICAL SYSTEM COMPRISING SAID FIBER SPLITTER DEVICE

This application is the U.S. national phase of International Application No. PCT/IB2016/056408 filed 25 Oct. 2016, the entire contents of which is hereby incorporated by reference.

FIELD OF THE INVENTION

The present invention relates to the field of holographic and interferometric imaging.

BACKGROUND

Holographic or interferometric imaging methods are used to characterize samples in both phase and intensity (or amplitude) contrast. The phase information is quantitative and of particular interest since it enables surface topography measurements on reflective samples and thickness or refractive index measurements with transparent samples. Moreover, in cell imaging it has been demonstrated that quantitative phase measurement (QPM) enables to monitor changes of morphology, of intracellular concentration, channel activity and others cellular processes. Holographic and interferometric imaging methods are optimally implemented using image sensors providing digital images of optically generated interference patterns or holograms, from which quantitative phase contrast images are generated by application of specific image processing methods.

For creating a hologram or an interferogram, it is mandatory to combine two beams: (i) an object beam containing the sample information, and (ii) a reference beam which haven't interacted with the specimen. And as these two beams must be coherent to each other in order to interfere, it is mandatory too that the reference and object waves are issued from the same light source, divided into distinct reference and objects arms of a setup. In addition, if the light source is of reduced coherence, interference occurs only when the optical path lengths of the reference and object waves propagating in their respective arms are equal, or differ by less than the coherence length of the light source between the splitting and recombination points of the interferometric or holographic setup.

Among diverse solutions proposed to implement holographic or interferometric imaging, those employing optical fiber delivery have already shown to be of particular relevance when complex three-dimensional geometries are required to implement desired optical paths. For example, a modular digital holographic microscopy concept which can be adapted to standard commercial optical microscope has been described by B. Kemper et al, in "Modular digital holographic microscopy system for marker free quantitative phase contrast imaging of living cells" (Proceedings of SPIE Vol. 6191, 2006). And the natural way of implementing both fiber optics delivery and splitting by use of an integrated fiber splitter device has also been published by Qu Weijuan et al, "Microlens characterization by digital holographic microscopy with physical spherical phase compensation" (Applied Optics, 49, 2010).

However, fiber splitting and delivery in holographic and interferometric imaging has only been reported with long-coherence lasers and with standard fiber splitters without controlled length differences between fibers exiting from the splitter. Present invention introduces a new fiber splitting solution with a controlled length difference for the fibers delivering the object and reference waves, and presenting several advantages compared to the prior arts. In particular, the present invention simplifies the management of reduced coherence light sources and enable easier implementation of optimal interference conditions, including wavefront matching and off-axis interference. In addition, apparatuses using the device according to present invention are more robust against vibrations and environmental perturbations, and can be produced more rapidly with reduced numbers of elements, while offering more flexibility in the design of instruments, in particular complex instruments combining different light sources and/or different imaging modalities.

SUMMARY

The present invention addresses the above mentioned inconveniences. The present invention concerns an optical system and a holographic or interferometric device.

A fiber splitter is a passive device used in fiber-optic networks and in fiber optics sensors. The present invention proposes a modification of such fiber splitter devices for their optimal integration in setups for holographic imaging or two-dimensional interferometry. This modification consists in precisely fixing a length difference between two fibers emerging from the fiber splitter in order to deliver light to the setup with a predefined optical path difference between the light which is used to create a reference wave, and the light which is used to illuminate a sample for creating an object wave. The fiber length difference is determined to satisfy at least one of the following requirements:

(i) Minimizing the optical path length (OPL) difference between the reference and object waves when they are recombined to interfere for creating a hologram or an interferogram. This enables to use reduced coherence light sources. In what follows, this requirement will be sometimes called the OPL matching condition.

(ii) Optimizing wavefront matching between the reference and object waves when they are recombined to interfere for creating a hologram or an interferogram. This enables to record holograms or interferograms with interference fringes as close as possible to the ideal case of a straight fringes pattern when flat surfaces are evaluated. In what follows, this requirement will be sometimes called the wavefront matching condition.

(iii) Design constraints imposed by the application, such as larges sample volumes or multiple light sources usage, as well as ergonomics or integration requirements, such as compactness or external access, or adaptation to existing instrumentation.

In summary, the fibers length difference is fixed in order to define optimal interferences conditions for creating holograms or interferograms, and in order to ensure optimal usage of the instrument incorporating the device of the invention.

A fiber splitter device according to present invention can be incorporated in various setups for holographic or interferometric imaging, in both transmission and reflection configurations to study respectively transparent or reflective samples. The present invention is of special interest for designing holographic or interferometric instruments dedicated to large surfaces inspection, or more generally when long distances are required between the sensor and the sample, because the condition of OPL matching can be satisfied in a much more compact and simplest way with a fiber-delivered reference wave compared to usual free space implementations. But, almost all forms of interferometric or holographic setups may benefit from the use of a device according to present invention. As examples of apparatuses appropriate for making advantageous use of fiber splitter devices according to present invention, we can cite: lensless holographic setups, digital holographic microscopes, interference microscopes, white light interferometers, vertical scanning interferometer, interferometric optical surface profilers, interferometers, phase-shifting interferometers. As well, optical instruments making use of interference processes for three-dimensional tomographic imaging can be produced using fiber splitter devices according to present invention.

Implementations of holographic or interferometric apparatuses using devices according to the present invention comprises portions where light is fiber-guided and others where light propagates in free-space, in both object and reference arms. In a preferred embodiment of the invention, the fiber length difference is determined in order to compensate the free-space optical path difference by a fiber guided optical path difference. In other words, the free-space optical path difference and the fiber guided optical path difference have same absolute values, but opposite signs.

The different fiber lengths compensate an optical path difference formed between an object electromagnetic wave and a reference electromagnetic wave during propagation in, for example, free-space in an optical device.

Designs of instruments using fiber splitter devices according to present invention will preferably maximize fiber-guided portions, because fiber-guided light is less sensitive to environmental perturbations, more robust against vibrations in terms of alignment stability, and simplified in terms of production compared to their equivalent free-space implementations, which must combine prisms and/or cubes and/or mirrors and/or lenses in adjustable holders to deliver light at equivalent positions. As a result, improved robustness and simplification are first evident advantages of the present invention, which brings in addition more freedom in the design of instruments thanks to the flexibility offered by fiber optics delivery, and easier integration of active or passive fiber-coupled or fiber-integrated elements. Moreover, using optical fibers to deliver light is attractive in holography and interferometry because wavefronts emerging from light guides are of high quality with low levels of aberrations especially with mono-mode and polarization-maintaining fibers.

The above and other objects, features and advantages of the present invention and the manner of realizing them will become more apparent, and the invention itself will best be understood from a study of the following description with reference to the attached drawings showing some preferred embodiments of the invention.

BRIEF DESCRIPTION OF SEVERAL VIEWS OF THE DRAWINGS

Herein, identical reference numerals are used, where possible, to designate identical elements that are common to the Figures.

DETAILED DESCRIPTION

Figure 1:
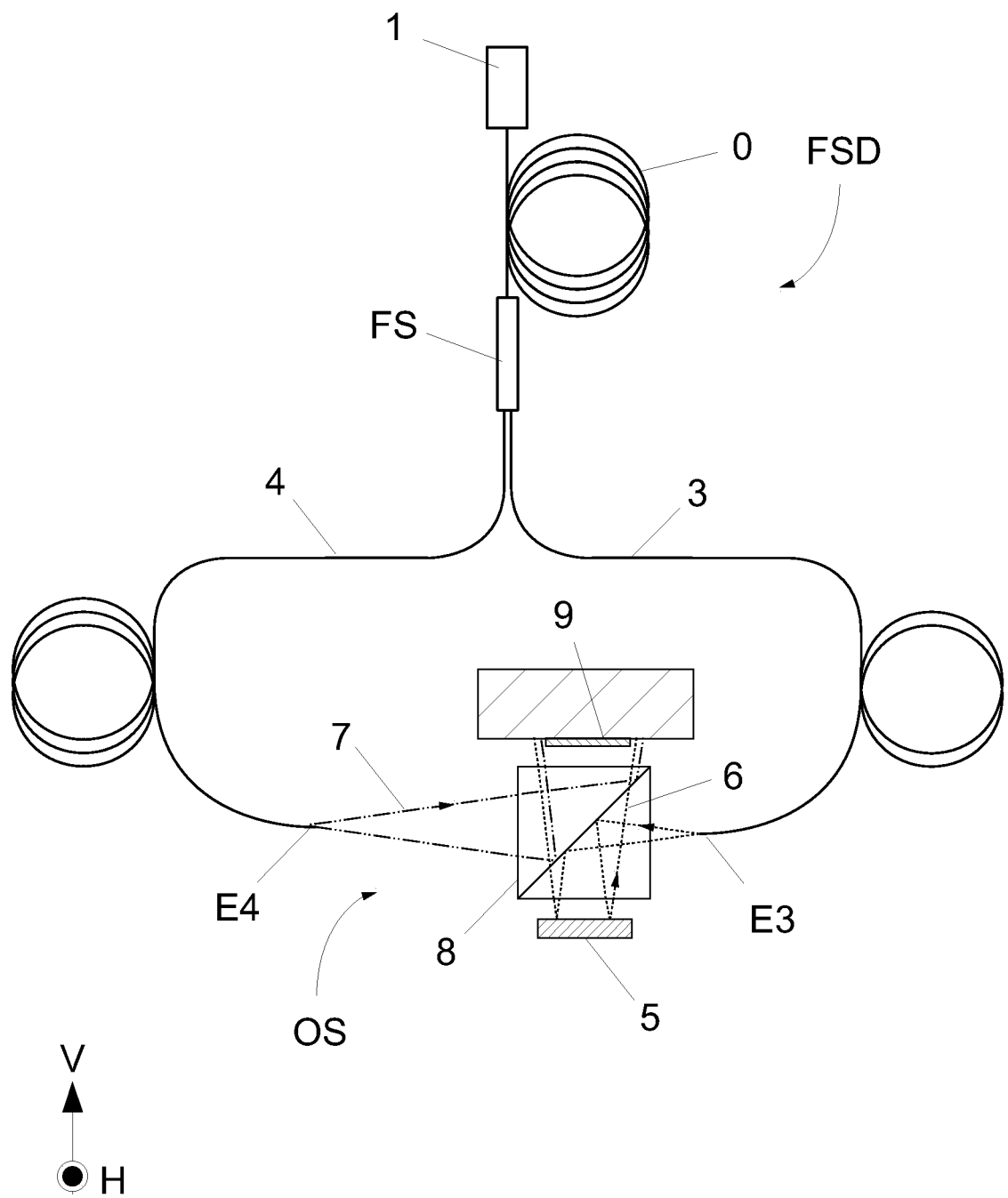
FIG. 1 depicts an exemplary optical design or system for lensless digital holographic imaging using a fiber splitter device according to present invention.

A fiber splitter device (FSD) of the invention comprises at least 3 optical fibers. A first one 0 collects the light emitted by a light source (1), a second one is named object fiber (3) and a third one is named reference fiber (4). The fiber splitter FS splits the light from the light source (1) into the object and reference fibers, which deliver light to an optical setup OS configured to generate an interference by recombining the light delivered by the object and reference fibers.

The interference occurs between a reference wave (7) and an object wave (6). The object wave (6) is generated by interaction of the light delivered by the object fiber (3) with a sample (5). The reference wave (7) is issued from the light delivered by the reference fiber (4) without interaction with a sample. The interference between the object wave (6) and the reference wave (7) creates a hologram or an interferogram which is recorded by an image sensor (9).

Reference and object waves in apparatuses using a fiber splitter device according to present invention combine two types of light propagation (are propagated in two different manners) defined as follows:

Fiber-guided propagation between the fiber splitter FS and the end of the object and reference fibers.

Free-space propagation from the end of the object and reference fibers to the sensor (9).

With free space propagation being understood here with a broad definition for all portions of the setup where light is not fiber-guided, including propagation through transparent or semi-transparent elements such as lenses, cubes, prisms or optical filters. In this broad definition, free space propagation includes also reflections or deviations by reflective or semi-reflective surfaces such as mirrors, filters or prisms.

The optical path length (OPL) or optical distance is the product of the geometric length of the path light follows through the system, and the index of refraction of the medium through which it propagates. In apparatuses using a fiber splitter device according to present invention, the optical path lengths of the reference and object waves comprise two types of contributions defined as follows:

Fiber-guided OPL in fiber-guided propagation portions between the fiber splitter FS and the end of the object and reference fibers.

Free-space OPL in free space propagation portions, from the end of the object and reference fibers to the sensor (9).

As a consequence, the optical path difference (OPD), which is defined as the difference between the OPL of the reference wave and the OPL of the object wave, comprise also two types of contributions:

Fiber-guided OPD for the difference in OPL between the reference and object waves in fiber-guided propagation portions, between the fiber splitter FS and the end of the object and reference fibers.

Free-space OPD for the difference in OPL between the reference and object waves in free space propagation portions, from the end of the object and reference fibers to the sensor (9).

An important feature of the present invention is that the lengths of the reference fiber (4) and of the object fiber (3) are different and fixed in order to compensate the free-space OPD by the fiber-guided OPD, in order to minimize the global OPD resulting from both fiber-guided propagation and free-space propagation. According to one embodiment, a fiber length is defined as the geometrical (or physical) length of the fiber from the fiber's connection or interface point at the fiber splitter FS to the fiber end at which the guided light exits the fiber. As a result, a fiber splitter device FSD according to the present invention has different fiber lengths for the reference fiber (4) and for the object fiber (3). In what follows, this difference between the lengths of the object and reference fibers 3,4 will be referred as the fiber length difference, and in a preferred embodiment, the fiber length difference is fixed so that the fiber-guided OPD has the same, or nearly/substantially the same absolute value as the free-space OPD, but is opposite in sign. In other words, if the free-space OPL is longer for the object wave (6) than for the reference wave (7), the reference fiber (4) will be longer than the object fiber (3), and vice versa.

In a preferred embodiment, a fiber splitter device according to present invention is realized using the same fiber type for the reference and object fibers (3,4), meaning in particular that both fibers have the same refractive index, and therefore that the fiber-guided OPD is directly proportional to the geometrical fiber length difference. But fiber splitter devices according to present invention can also be realized using different fiber types for the object fiber (3) and for the reference fiber (4). In such cases, if the reference fiber (4) and the object fiber (3) have different refractive indices, a fiber splitter device according to present invention may define a non-zero fiber-guided OPD with the same or nearly/substantially the same geometrical lengths for the reference and object fibers (3,4).

Apparatus or systems making use of a fiber splitter device according to the present invention can for example be designed following a procedure comprising the steps of:

a) Choosing an image sensor (9) and at least one light source (1)

b) Optical design or configuration for the free-space propagation of the object wave (6).

Depending on the desired transverse resolution and field of view (FOV), the free-space portion of the object wave in which the object wave is propagated may comprise at least one imaging lens to create a magnified or reduced image of the sample (5). Additional lenses can also be added to shape the light delivered by the object fiber (3) for proper illumination of the sample (5), as well as reflective or partially reflective surfaces to deviate the light on the sample and/or on the image sensor (9). According to the teaching of holographic imaging, this free-space portion of the object wave may also be exempt of imaging lenses, and according to the teaching of holographic microscopy, a magnified or reduced image of the sample can be formed at certain distance from the image sensor (9) for out-of-focus recording.

c) Optical design or configuration for the free-space propagation of the reference wave (7). In a preferred embodiment, the reference wave (7) is defined in order to generate an off-axis interference, meaning that its propagation direction makes an angle with respect to the propagation direction of the object wave (6) as viewed from image sensor (9). But in-line implementations, with parallel object and reference waves, as known for example in phase shifting interferometry or vertical scanning interferometry are also possible. The free-space optical design of the reference wave (7) may comprise reflective or partially reflective surfaces, or optical prisms to deviate the light towards image sensor (9) at proper off-axis angle. The free-space optical design of the reference wave (7) may also comprise lenses to shape the light delivered by the reference fiber (4) for proper illumination of the image sensor (9), ideally satisfying the wavefront matching condition, meaning that, except a potential tilt and/or a potential lateral shear as required for off-axis interference, the wavefronts of the reference wave (7) match closely those of the object wave for a flat sample, wherein match closely means that the object and reference wavefronts have similar curvatures, at least at the second order, so that straight or nearly straight fringes compose the interference pattern resulting from the superposition of the reference waves (7) and of the object wave (6) for a flat sample.

d) Optical design for the free-space propagation common to both object and reference waves including combining means to superpose the object and reference waves in order to generate an interference pattern on the image sensor (9). An adequately positioned and sized cube beam splitter (8) is for example sufficient in most cases for this operation, but plate or dichroic splitters can be used too as well as more sophisticated solutions comprising prisms and/or reflective or semi-reflective surfaces. Combining means can also be suppressed if the reference and object waves are designed so that they reach the image sensor (9) without proper interfering capabilities.

e) Calculating precisely the free-space OPL of the object and reference waves, and calculating the associated free-space OPD. This requires knowledge of both the geometric lengths and of the refractive indexes of materials crossed by the object and reference waves in free-space propagation. This can be done using theoretical models to simulate free-space wave propagation, for example by recourse to optical design software tools, such as Zemax or Optics Studio, or Oslo (Optics Software for Layout and Optimization), or Code V. An experimental validation can be performed too, but simple modelization based geometrical optics rules, and on the knowledge of optical element thicknesses and refractive indices is generally sufficient.

f) Determining the fiber length difference required to define a fiber-guided OPD compensating the free-space OPD, i.e. with same or nearly same absolute value but with an opposite sign. This requires the knowledge of the refractive index of the fibers.

g) Optionally adding adjustment means to fine tune the free-space OPL of the reference wave (7) and/or the free-space OPL of the object wave (6). This can be done by adding at least one (mechanical) device (for example, a translation stage) for translating the end of the reference fiber (4) and/or the end of the object fiber (3). Optionally, this translation may also comprise others optical elements of the free-space design, such as for example at least one lens positioned just after a translated fiber end. Optionally too, glass plates with appropriate thickness and refractive index can be added in the path of the object or reference waves.

h) Optionally adding adjustment means to control the polarization of the reference wave (7) and/or of the object wave (6), so that they optimally interfere with identical polarizations. This can be done by adding at least one (mechanical) device for rotating the end of at least one of the reference or object fibers (for example, a fiber end rotator). Optionally fiber polarization controllers can be included and used on the fiber-guiding portions of the setup. Optionally too, polarization control optics can be inserted in the free-space portions of the setup, such as half or quarter wave plates, polarizers or polarizing beam splitters.

Exemplary apparatus or systems making use of a fiber splitter device FSD according to the present invention comprise at least one light source (1) fiber coupled to a fiber splitter FS. Fiber coupling between the light source (1) and the fiber splitter FS can be direct, meaning that the light source (1) is for example directly pigtailed to a fiber whose opposite end is entering into the fiber splitter FS, or indirect meaning recourse to an additional fiber to fiber connection and/or meaning that a free-space emitting light source is fiber coupled. The light source (1) can advantageously be a reduced coherence light source or a long coherence light source. Light emitting diodes (LED), vertical-cavity surface-emitting laser (VCSEL), laser diodes, lasers, superluminescent diodes (SLD), pigtailed diodes, pulsed light sources, stabilized lasers, stabilized laser diodes, fiber lasers, active nanostructured fiber lasers, diode pumped solid state (DPSS) lasers, distributed Bragg reflector (DBR) lasers, fiber Bragg grating (FBG) laser diodes, volume holographic grating (VHG) lasers, and tunable light sources, are examples of light sources (1) which can be used.

As described later, several different light sources at different wavelengths and/or powers and/or polarization states can be used by the same instrument for simultaneous or sequential acquisition of interferometric or holographic information at various wavelengths and/or powers and/or polarization states.

As well, at least two identical light sources can be coupled to increase available optical power, possibly by use of a fiber-coupler. In addition, thanks to fiber delivery, the light source or a combination of light sources can be located at long distances from the instrument using it, and can additionally be fiber split to deliver light from same light source or from same combination of light sources to several distinct instruments.

According to usual wording in optical fiber technology, a fiber splitter FS as used by a device according to present invention may also be called a fiber coupler or a fiber combiner. The fiber splitter FS and its connected fibers can be of the single-mode or multimode types. The fiber splitter FS and its connected fibers can be of the polarization maintaining (PM) type or not. Diverse splitting ratio can be applied by the fiber splitter FS, but ratios defining similar optical power levels for the object and reference waves are preferable.

Fused Biconical Taper (FBT) splitters and Planar Lightwave Circuit (PLC) splitters can be used as well as any equivalents, as long as it splits the light arriving from at least one fiber into at least two fibers.

A setup including a cube beam splitter and at least three fiber coupling ports including focusing or collimation lenses can also be used. Wavelength division multiplexers (WDM) can be used too for multi-wavelengths combinations. More than one fiber splitter FS or fiber splitters with more than three fibers can be used too, for example when several light sources are combined or when desired measurements require more than one object wave (6) and/or more than one reference wave (7). As well, fiber splitters can be cascaded for additional splitting and/or combining purposes, meaning that at least one additional fiber splitter can be inserted at the end of a fiber exiting from another fiber splitter. Fiber splitters with unused fibers can be implemented too.

The setting of different lengths for the reference and object fibers (3, 4) can be done at the manufacturing process of the fiber splitter FS device, for example by fixing fiber connectors at different fiber lengths from the fiber splitter FS, or later by recourse to at least one fiber extension plugged on at least one fiber exiting from the fiber splitter FS through a fiber to fiber connection. About fiber lengths, it is important to precise that the important specification of a device according to the invention is the fiber length difference, regardless the absolute lengths of the fibers. Potentially, the light source (1) and the fiber splitter FS can be located far from the holographic or interferometric instrument.

Fibers entering or exiting a fiber splitter FS device according to present invention can be optionally interrupted along their paths to insert fiber-coupled or fiber integrated optical devices of the active or passive types. This permits holographic or interferometric instruments incorporating for example modulators, such as electro-optic or acousto-optic modulators, in a much more simple and robust way than with full free-space designs. Fiber couplers, fiber circulators, fiber isolators, fiber attenuators, fiber polarizers, fiber polarization controllers, optical switches, optical fiber amplifiers, fiber-Bragg gratings, distributed Bragg reflector, or modulators such as amplitude modulators or phase modulators or polarization modulators, are examples of fiber coupled or fiber integrated devices which can be incorporated advantageously along the fiber-guided portions of an instruments using fiber splitter devices according to present invention. In addition, fiber coupled or fiber integrated devices can be plugged at the extremities of the fibers entering or exiting the fiber splitter FS, such as fiber collimators, gradient index lenses, pigtailed lenses, pigtailed Faraday mirrors, fiber optic retroreflectors, or fiber terminators.

A first example of implementation is given in FIG. 1 for a so-called lensless setup of digital holographic imaging. The free-space optical device or design OS of FIG. 1 is composed of a beam splitter cube (8) and preferably a single beam splitter cube (8) located between the sample (5) and the image sensor (9), defining a very compact sensor or system whose global structure, including the fiber splitter FS and the light source (1), can be designed with a large flexibility thanks to fiber optics delivery. The image sensor 9 for recording the interference pattern can be for example a camera, such as a digital camera.

In the embodiment of FIG. 1, an off-axis configuration is represented by a (small) vertical translation of the reference fiber (4) end E4 relative to the end E3 of the object fiber 3 which is higher in the plan of the drawing than the end E3 of object fiber (3). That is, the end E4 of fiber 4 is closer to the light detecting plane of the sensor 9 along the direction V illustrated in FIG. 1. The reference fiber (4) end E4 can also be translated along an axis perpendicular to the plan of the drawing (a direction parallel to the light detecting plane of the sensor 9 along the axis H illustrated in FIG. 1), and optionally mounted on an orientable mount with angular adjustment possibilities to ensure optimal beam centering in an off-axis configuration.

In the setup of FIG. 1, the free-space propagation of the object wave (6) crosses twice the glass thickness of the recombination beam splitter cube (8), while the reference wave (7) crosses it only once. To satisfy the wavefront matching condition, the geometrical distance between fiber ends to image sensor (9) must be longer of about one third of the cube (8) size in the object arm than in the reference arm. This estimation of one third of the cube size results from the standard approximation for the calculation of the so-called focus shift appearing when a diverging beam crosses a thick glass plate with a refractive index of 1.5. As a result, assuming again a refractive index of 1.5 for the cube, the free-space OPD according to FIG. 1 can be calculated as being ⅚ of the cube (8) size.

As the free-space OPL is longer for the object wave, the reference fiber (4) must be longer in length than the object fiber (3), with a fiber length difference equal to ⅚ of the cube size, assuming again a refractive index of 1.5 for the fiber. Thus, the reference fiber 4 is longer. Of course, the fiber length difference, the free-space OPD and OPLs can be evaluated more precisely, and wavefront matching can be optimized by recourse to more accurate values for the refractive indexes at corresponding wavelengths, and by using more exact models to simulate free-space wave propagation, for example by recourse to optical design software tools, such as Zemax or Optics Studio, or Oslo (Optics Software for Layout and Optimization), or Code V. In practice, the object optical path length can also be fine tuned by translating the specimen up or down (towards or away from image sensor (9)).

Alternatively, the longer free-space OPL for the object wave can be compensated using a fiber composed of a different material type (different refractive index) for the object fiber (3). This could also be achieved by alternatively using a fiber composed of a different material type (different refractive index) for the reference fiber (4).

For example, the fiber core material in which light is propagated along the fiber is of different material type (different refractive index).

Alternatively, the object fiber or the reference fiber may include a first section of a first length composed of a material of a first refractive index and a second section of a second length composed of a material of a second refractive index different to the first refractive index. The first and second sections may be connected together for example with a fiber connector.

In such a case the object fiber 3 and the reference fiber 4 can have the same geometrical length (or substantially the same geometrical length) or different geometrical lengths.

In a lensless setup as presented in FIG. 1, for a given image sensor size and resolution, the optical transverse resolution and the field of view (FOV) can be modified by changing the divergence of light emitted by the object fiber (3) at end E3. The greater the divergence, the smaller the field of view and the transverse resolution. As a result, fibers with a large numerical aperture (NA) are preferred to privilege the resolution, and fibers with a lower numerical aperture (NA) are preferred to privilege larger FOV. If ideal fiber NA are not available, lenses positioned at the fiber ends E4, E3, or close to the fiber ends E4, E3, can be used to increase or to decrease the divergence, possibly pigtailed lenses or gradient index (GRIN) lenses directly coupled to the fiber ends E4, E3.

From the embodiment of FIG. 1, in accordance with another embodiment, a transmission lensless setup or system for transparent sample observation can easily be derived by simply positioning the object fiber (3) or end E3 below the sample 5 in front of the image sensor (9). In this case the free-space OPD is restricted to the sample optical thickness. Therefore, the fiber length difference for a transmission lensless setup can be fixed for a default or pre-defined sample OPL, and the reference free-space OPL can be fine tuned by translating the end E4 of the reference fiber (4) towards or away from the beam splitter cube (8).

Compared to non-fibered equivalent setups based on so-called Michelson or Mach-Zehnder lensless configurations, using a fiber splitter device FS according to present invention as shown in FIG. 1 presents several advantages. First of all and principally, it is noticeable that a reference wave can be created without use of any mirrors nor lenses, with optimal off-axis settings and optimal illumination of the image sensor (9). Then, the light source (1) can advantageously be positioned very freely around the setup, even at large distances without any added complexity. Finally, large image sensors, of for example 1 inch diagonals or larger, can be easily integrated by a simple scaling on the fiber distances and cube (8) size, offering an attractive low-cost solution to integrate high resolution image sensors in digital holography setups.

A lensless setup as presented in FIG. 1 is typically well adapted for imaging samples whose size is approximately ⅓ to ⅔ of the chip size of the image sensor (9), i.e. typically millimeter sized objects with typical transverse resolution of a few microns. The working distance in a lensless setup as in FIG. 1 is also typically in the range of few millimeters.

For a specimen larger than the chip of the image sensor (9), and/or specimen located at large distances from the image sensor (9), imaging optics must be used to form a reduced size image of the sample. In such cases, the object free-space OPL can be long and fiber splitter devices FSD according to present invention are of particular interest because they enable to satisfy the OPL matching condition with very compact and simple optical designs for the free space portion of the reference wave, by simply defining a long fiber length difference, with an object fiber (3) shorter than the reference fiber (4).

Figure 2:
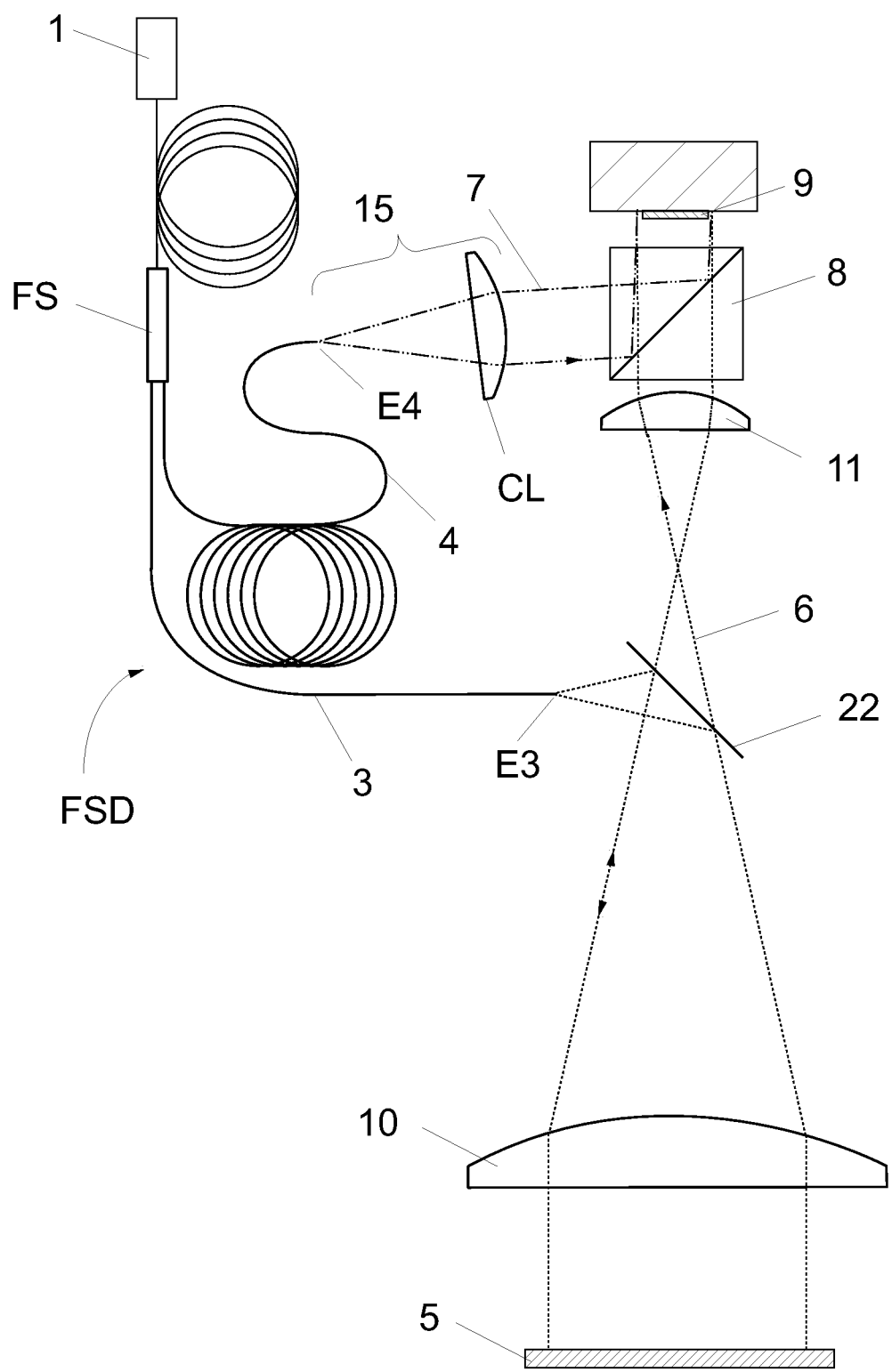
FIG. 2 depicts an exemplary implementation of a fiber splitter device according to present invention for holographic or interferometric imaging of large samples with large field of views.

A further exemplary implementation enabling large field of views is shown in FIG. 2. Here, a first lens named objective lens (10) collects the light reflected by the sample (5) and a second lens named image lens (11) forms an image. For an interferometric implementation, the image is formed on the image sensor (9), for a holographic implementation the image is formed in front of or behind the image sensor (9) for out-of-focus recording. Between the imaging 11 and objective 10 lenses, a semi-transparent surface (22) (partially reflective-partially transmissive) such as a cube beam splitter reflects the light delivered by the object fiber (3) for co-axial illumination of the sample (5), and a cube beam splitter (8) is inserted after the imaging lens (11) to combine the object wave (6) with a reference wave (7) in order to form a hologram or an interferogram on the image sensor (9).

The reference wave (7) is provided as an off-axis reference wave by collimating the light delivered by the reference fiber (4). Optionally, a mirror can be added between the reference fiber end E4 and the beam splitter cube (8), to reflect the reference wave with an off axis angle. Optionally too, the reference wave (7) can be provided in-line (parallel object and reference waves) for phase-shifting or vertical scanning interferometry.

As schematically shown in FIG. 2, the reference fiber (4) length is much longer than the object fiber (3) length in order to compensate the large free-space optical path difference resulting from the presented arrangement. Using a fiber splitter device FSD according to present invention is very advantageous in this case, because a reference wave satisfying the OPL matching condition in an equivalent full free-space implementation would require large geometrical distances and several beam deviations to direct the light source on the sensor. With the solution of present invention as presented in FIG. 2, a large field of view interferometer or holographic instrument can be realized in almost the same volume as a simple equivalent non-interferometric imaging system with same field of view.

In the setup of FIG. 2, the focal length fo of the objective lens 10 is longer than the focal length fi of the imaging lens 11, and if the distance between the 2 lenses is equal to fo+fi, the magnification factor is given by the ratio fi/fo and will be smaller than unity, meaning a field of view larger than the chip size of the image sensor (9). A large variety of field of views, from a few millimeters up to several inches for full wafer imaging, can be achieved with a setup as shown in FIG. 2, by just scaling the focal lengths ratio and if required the lenses diameters.

If required, for example when the light source (1) is of short coherence, the free space OPD can be finely tuned by translating the sample (5) up or down (towards or away from the sensor 9) with respect to the optical arrangement. Optionally the ensemble (15) composed of the reference fiber end E4 and of the next collimating lens CL can be also translated along the reference wave (7) axis. The setup of FIG. 2 can also be adapted in a further embodiment for transmission imaging of transparent or semi-transparent specimen by positioning the object fiber (3) or the end E3 below the sample 5, and optionally duplicating the objective lens (10) below the sample 5.

Non-interferometric vision systems, sometimes referred as being telecentric vision systems, or beam expander vision systems, or telescope, or zoom lens, or simply camera lenses can be adapted to includes the features of the present invention. Various designs or configurations are available producing various magnification factors, including unit 1× magnification, and various working distances from millimeters to meters. Such vision systems often combine more than two lenses, including multi-elements lenses such as doublets or triplet, and aperture stops as well as possibly relay lenses. Adapting such systems for interferometric or holographic imaging is possible by including a fiber-splitter device FSD according to the invention. Following the teaching of FIG. 2 and of the corresponding description, we can see that required adaptations are:

Adding semi(partially)-reflective surface (22) for a co-axial illumination.
Adding a port for a reference wave (7), including a port for a reference fiber (4).
Adding a beam-splitter cube (8) or an equivalent device for object and reference waves recombination.
Dimensioning the fiber length difference depending on free-space OPL evaluated for both reference and object waves.

Figure 3:
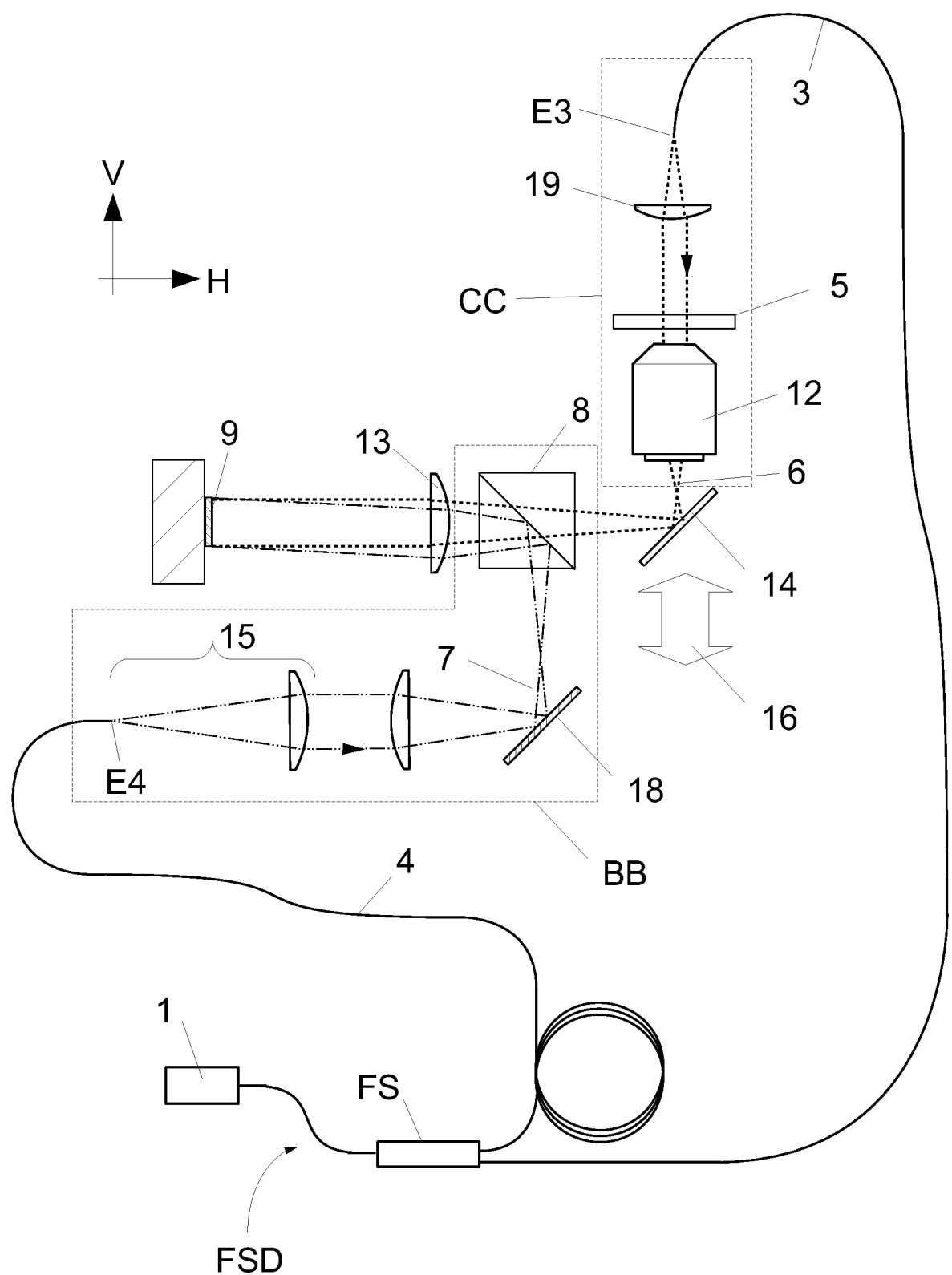
FIG. 3 depicts an exemplary implementation of a fiber splitter device according to present invention for holographic or interferometric transmission microscopy of samples with high resolution.

FIG. 3 presents a further implementation of a fiber splitter device FSD according to the present invention for transmission holographic or interference microscopy. In the setup of FIG. 3, a microscope objective lens (12) forms a magnified image of the sample (5), which is focused by a tube lens (13). For an interference microscopy implementation, the magnified image is focused on the image sensor (9), for a digital holographic microscopy implementation, the image is focused behind or in front of the image sensor 9 for out of focus recording. If the objective (12) is not infinity corrected, the tube lens (13) can be suppressed. In FIG. 3, sample (5) illumination is performed in transmission by simply collimating the light emerging from the object fiber (3) but convergent or divergent illumination are also possible, as well as adding additional lenses and/or reflective interfaces between the objective (12) and the object fiber (3) length. Sample illumination directly by the object fiber (3) without additional lenses is also possible.

In the embodiment of FIG. 3, the reference wave (7) is provided by first collimating the light delivered by the reference fiber (4) with a first lens, and then focusing it again with a second lens whose focal and position are determined by the wavefront matching condition. In FIG. 3, mirror (18) can be advantageously tilted and positioned to reflect an off-axis reference wave (7) after recombination by the beam splitter cube (8), but an in-line reference wave (7) can also be implemented for phase shifting interferometry. Optionally, the mirror (18) in the reference arm can be suppressed and the reference wave (7) can be implemented vertically with respect to the plan of the drawing.

Optionally, the ensemble (15) composed of the end E4 of the reference fiber (4) and of the first collimating lens of the reference wave (7) can be translated horizontally with respect to the plan of the drawing (towards or away from the second lens or mirror 18 along axis H), in order to fine tune the reference free-space OPL. Translating the ensemble (15) can be useful to adapt the OPL matching condition to different optical thickness of the sample (5), or to different objective magnifications. The free space optical designs providing a reference wave (7) and an object wave (6) can be more simple than the implementation presented in FIG. 3. Lenses can be suppressed or added, as well as prisms or mirrors or filters. As well, the tube lens (13) can be positioned before the beam splitter cube (8).

In the setup of FIG. 3, the object wave (6) is reflected just after the objective (12) by a reflective element (14). Advantageously, this reflective element (14) can be a dichroic mirror or splitter, reflecting specifically the wavelength of the light source (1) and transmitting as broadly as possible other optical wavelength. Using such a dichroic element 14 enables to define an additional port (16) on the holographic or interferometric microscopy setup, which can be used to implement other measurements or imaging modalities. For example, the external port (16) can be used to connect the setup to another camera enabling standard bright field or phase contrast or fluorescence microscopy. If required by one of these additional modalities, at least one additional light source can be coupled by use of dichroic elements inserted between the object fiber (3) and the sample (5) for trans-illumination. At least one additional light source can also be coupled trough the additional port (16) for epi-illumination. For fluorescence microscopy, both excitation and emission fluorescence signals can be transmitted through the additional port (16), assuming that a fluorescence cube is inserted below dichroic element (14) in order to reflect a fluorescence light source and to transmit a fluorescence emission image towards an additional camera.

In the setup of FIG. 3, the free-space OPD is smaller than for the setup of FIG. 2, and an important advantage of using a fiber splitter device FSD according to present invention in FIG. 3 is that the reference and object fibers can deliver light at distant positions optimally defined to generate desired interference conditions with short free-space OPL. Obviously, implementing a full free-space version of the setup of FIG. 3 satisfying the OPL matching condition with reference and object beams delivered at opposite corners of the setup would require several reflections by mirrors accurately positioned and adjusted, meaning higher complexity of the system configuration and of the mechanical design and a more time-consuming instrument production.

An important point to note about FIG. 3 is that a full free-space implementation of a similar setup could be simplified by defining a reference arm parallel to the objective (12), with reference wave (7) optics positioned at the same height as the objective (12). But in this case, the volume available for holding and positioning the sample (5) would be significantly reduced and this illustrates quite well another advantage of the present invention for designing holographic or interferometric instruments with improved ergonomics. To go one step further with ergonomics considerations, it is interesting to note that, in a three-dimensional implementation of FIG. 3, the reference arm including the beam splitter cube (8) can be advantageously rotated by 90 degrees around an axis H perpendicular to the image sensor (9) and centered on the image sensor (9). Such a rotation enables indeed to bring all elements surrounded by a fine dashed line in FIG. 3 (reference number BB), in the same horizontal plane as the image sensor (9), with the benefit of defining a broad free space under the holographic or interferometric instrument, meaning more flexibility to exploit the external port (16).

Figure 4:
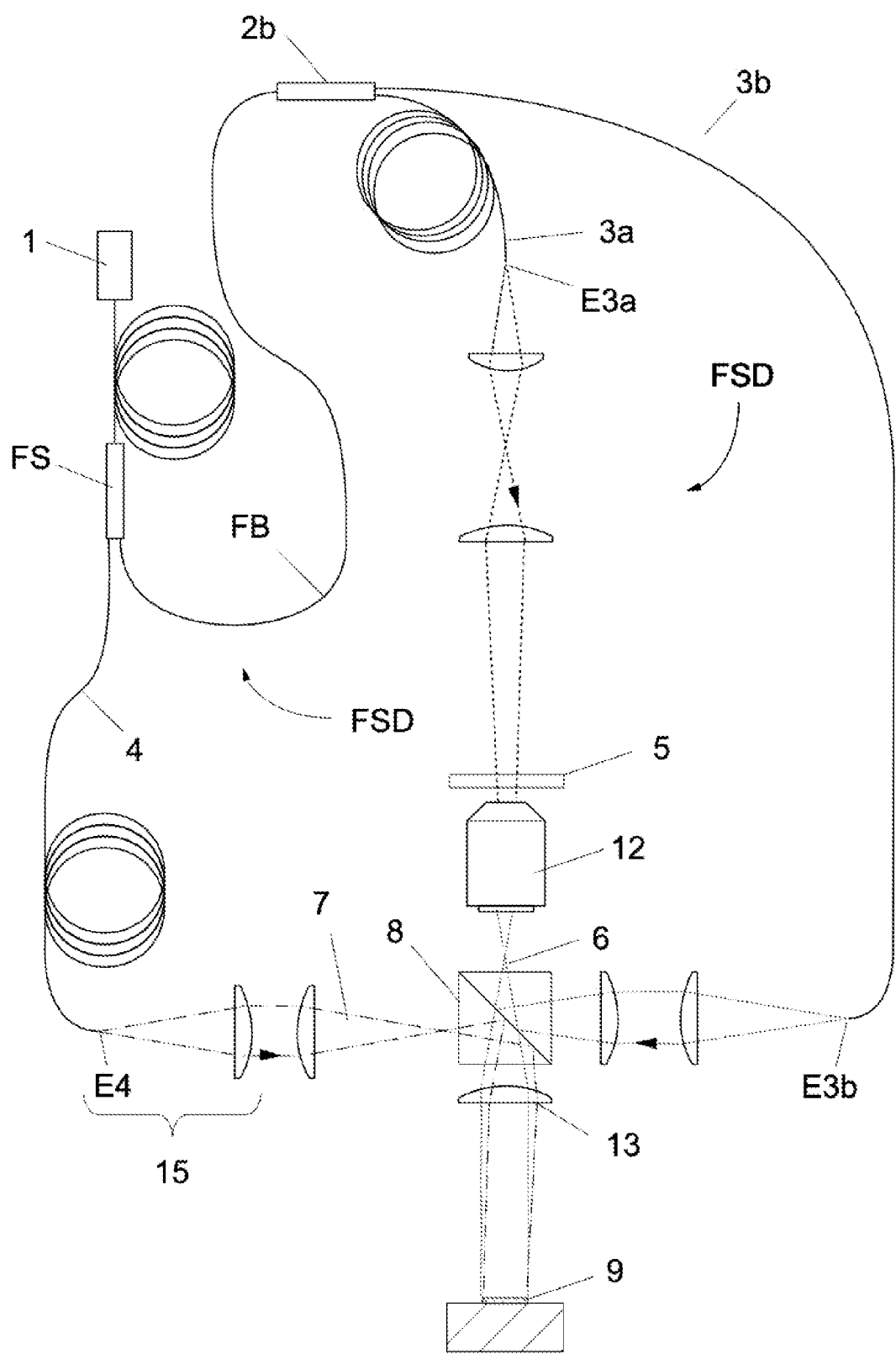
FIG. 4 depicts an exemplary implementation with two fiber splitter devices according to present invention for holographic or interferometric microscopy in both transmission and reflection.

Fiber splitter devices FSD according to present invention can also be cascaded in the design of instruments, and FIG. 4 presents an example of such an implementation enabling both reflection and transmission holographic or interferometric microscopy. In FIG. 4, a first fiber splitter FS splits the fiber-coupled light source (1) into a reference fiber (4), and into a second fiber FB, which is coupled into a second fiber splitter (2b). The second fiber splitter (2b) splits the light delivered by the first fiber splitter FS into a first object fiber (3a), and into a second object fiber (3b). The first object fiber (3a) provides illumination for transmission microscopy, and the second object fiber (3b) provides illumination for reflection microscopy by epi-illumination through the microscope objective (12).

In FIG. 4, the reference wave (7) is off-axis and provided with two lenses, as in FIG. 3 with the exception of mirror reflection which can be optionally added in FIG. 4. The reference wave (7) in FIG. 4, can also be provided without off-axis angle for in-line interference. In FIG. 4, a tube lens (13) focuses the image collected by the microscope objective (12) and both in- or out-of-focus image recording are possible by adjusting the tube lens (13) to image sensor (9) distance. Optionally the tube lens (13) can be suppressed if the objective (12) is not infinity corrected. Optionally, the ensemble (15), composed of the reference fiber end and E4 of the first lens collimating the reference light, can be translated for fine tuning of the reference free-space OPL.

With the setup of FIG. 4, holograms or interferograms are created by interference between the reference wave (7) and an object wave (6), which can be generated by two different ways: (i) in transmission by illuminating a transparent or semi-transparent sample (5) with the first object fiber (3a), and/or (ii) in reflection by illuminating a reflective or semi-reflective sample (5) with the second object fiber (3b). Switching from transmission to reflection modes can be achieved by closing the unused channel, for example with a shutter, but holograms or interferograms can also be recorded combining both transmitted and reflected object waves (6). As well, interferences can be generated between the transmitted and reflected object waves by closing the channel of the reference wave (7).

A variant of the FIG. 4 setup is implemented using a single fiber splitter, by just plugging the same object fiber at two different locations of the setup for switching from transmission to reflection modes. Another variant, based on the teaching of FIG. 5 or FIG. 6, can be implemented with two references waves for simultaneous transmission and reflection imaging with a single image sensor (9), possibly by cascading a third fiber splitter on the reference fiber (4). Another variant enabling simultaneous reflection and transmission microscopy can be implemented with two different light sources, possibly of different wavelengths. Of course, upright or inverted implementations of a setup as presented in FIG. 4 are both possible by 180 degree rotation.

As a full free-space implementation of a setup equivalent to FIG. 4 is possible only by adding many additional components, the advantage of using fiber splitters according to present invention is again well illustrated by FIG. 4, which demonstrates that complex apparatuses bringing innovative interferometric data can be realized much more efficiently by using fiber splitter devices with well defined fiber lengths.

Figure 5:
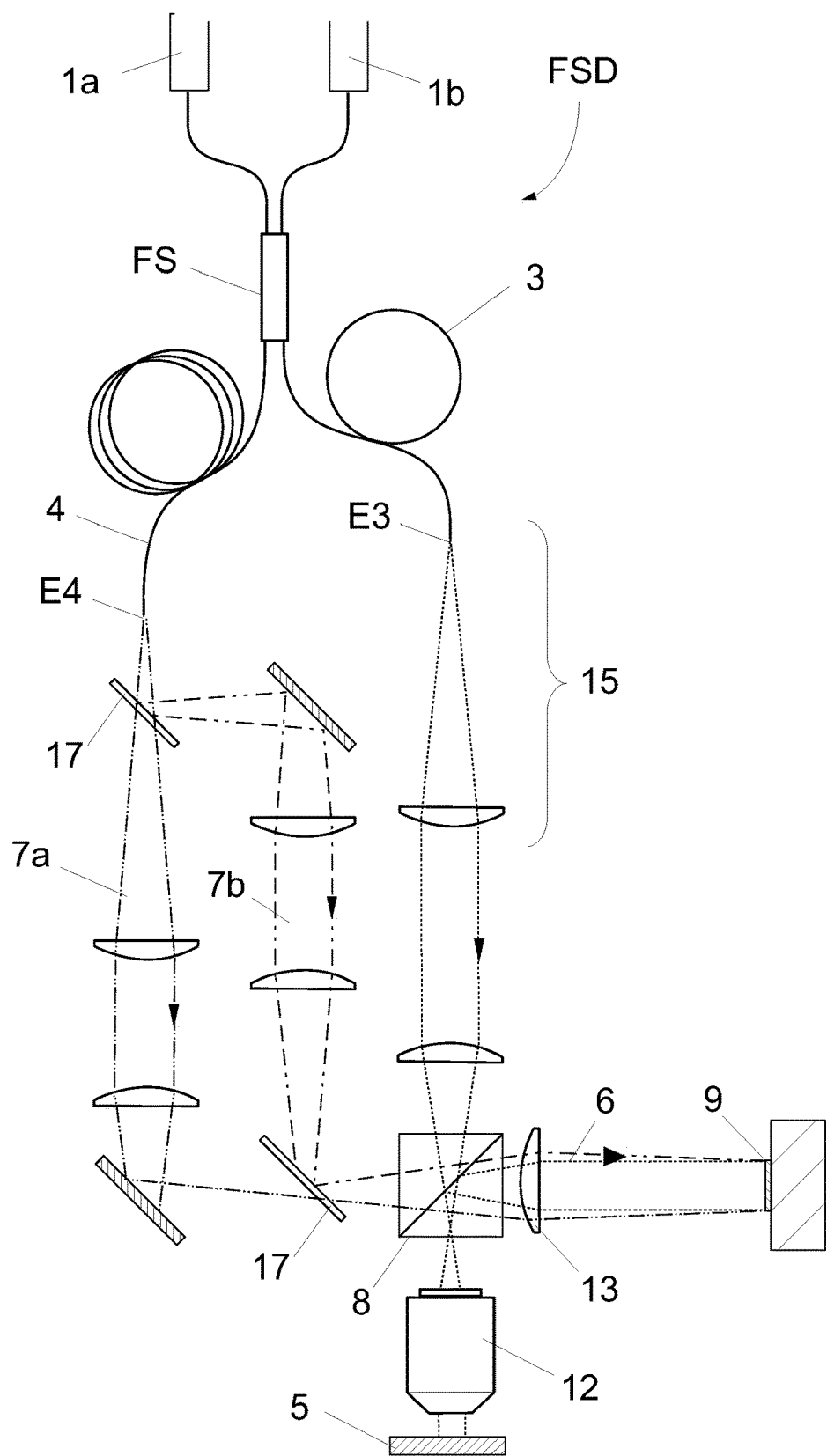
FIG. 5 depicts an exemplary implementation of a fiber splitter device according to present invention for holographic or interferometric reflection microscopy with two light sources.

FIG. 5 shows another implementation of a fiber splitter device according to the invention, in a setup enabling interferometric or holographic microscopy with more than one wavelength. In FIG. 5, the fiber splitter FS splits two fiber coupled light sources (1a) and (1b), into an object fiber (3) and into a reference fiber (4). Both reference and object fibers combine light from the first light source (1a) and light from the second light source (1b), and in a preferred embodiment, the two light sources have different wavelengths.

The light from the object fiber (3) is first collimated by a first lens and then focused by a second lens close to the back focal plane of a microscope objective (12), which transmits the light for illuminating the sample (5). The object wave (6) is created by collecting the light reflected by the sample (5) with the microscope objective (12), and as the object wave (6) combines light from the two light sources, the tube lens (13) focuses two superposed images, one for each source, on the image sensor (9), or close to the image sensor (9) for out-of-focus recording.

In the reference arm in FIG. 5, the light delivered by the reference fiber (4) is split by a dichroic element (17) reflecting the light from the second source (1b) and transmitting light from the first source (1a), and two separate reference waves are generated: (i) a first reference wave (7a) has the wavelength of the first source (1a), (ii) a second reference wave (7b) has the wavelength of the second source (1b).

References 7a and 7b are reflected towards image sensor (9) with different off-axis angles, so that a single frame acquired by the image sensor (9) records simultaneously two superposed holograms or interferograms, one for each light source, which can be reconstructed to provide dual-wavelength interferometric or holographic information, for example following the teaching of publication "Real-time dual-wavelength digital holographic microscopy with a single hologram acquisition" (J. Kuhn et al., Optics Express, Vol. 15, No. 12, 2007, p. 7231).

Figure 6:
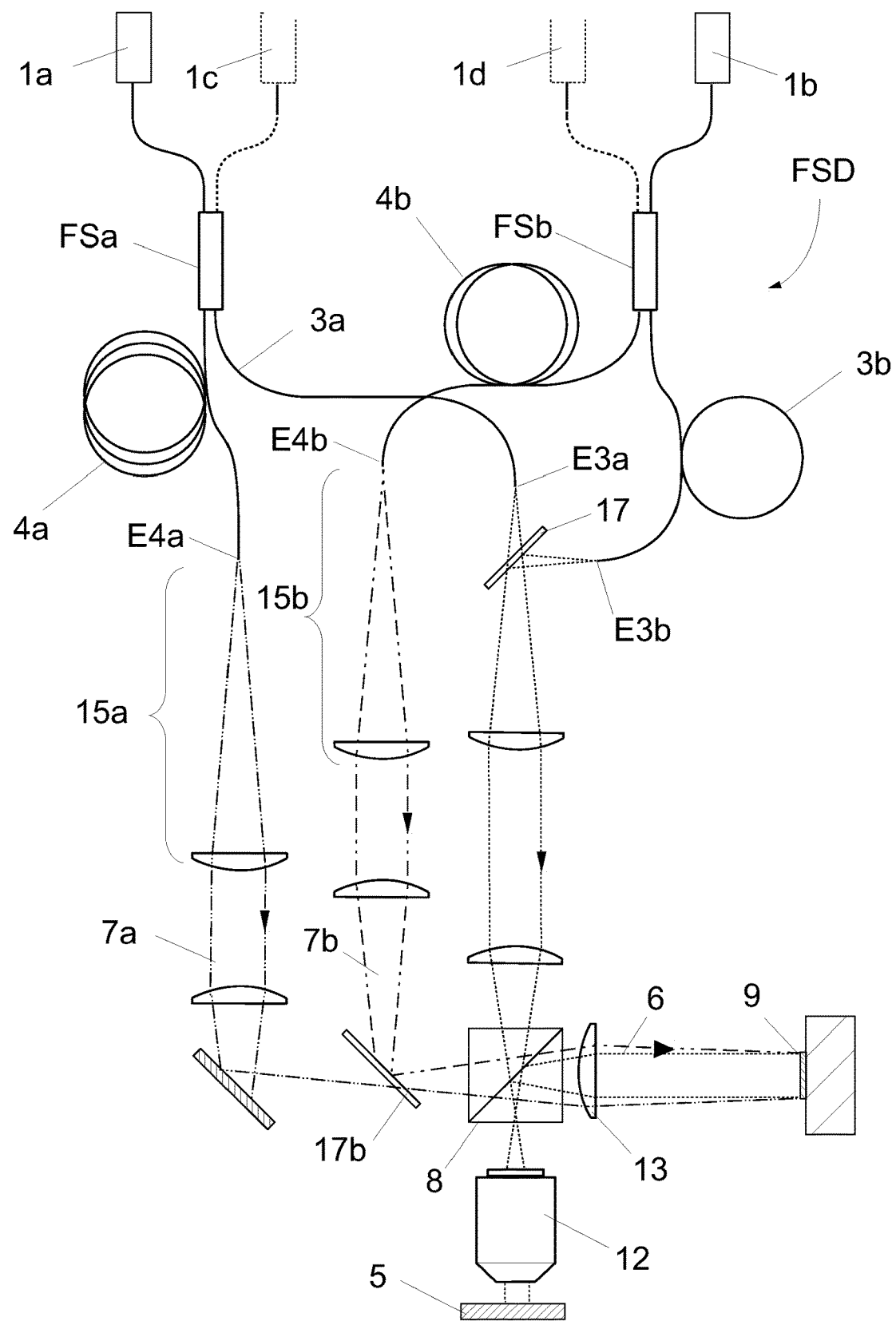
FIG. 6 depicts an exemplary implementation with two fiber splitter devices according to present invention for holographic or interferometric reflection microscopy with at least two light sources.

Dual wavelength interferometric or holographic measurements can also be achieved using the setup of FIG. 6, whose principle is same as for FIG. 5, except that two separate fiber splitters (FSa) and (FSb) are used, one for each light source (1a) and (1b), providing two object fibers (3a) and (3b), and two reference fibers (4a) and (4b).

In the embodiment of FIG. 6, a dichroic element (17) is used in the object arm to combine the light emitted by the two object fibers 3a, 3b. Optionally, the dichroic element 17 can be replaced by a fiber coupler combining the two object fibers 3a,3b into a single one. As in FIG. 5, a dichroic element (17b) is also used in the reference arm of FIG. 6 for transmitting first reference wave (7a) and reflecting second reference wave (7b). In the embodiment of FIG. 6, fine adjustments of the references free-space OPL can be achieved separately for each reference wave, by translation of ensemble (15a) and/or ensemble (15b). In the embodiment of FIG. 5, fine adjustment of the object free-space OPL can be achieved by translation of ensemble (15) comprising the end E3 of the object fiber (3) and of the first collimating lens.

Dual wavelength interferometric or holographic measurements can also be achieved with all presented implementations. With the lensless setup of FIG. 1, a second reference can be added perpendicular to the existing one and combined by a dichroic element, as well in the setup of FIG. 2 for large field of views. For transmission microscopy, a second reference can be added below the one represented in FIG. 3 and again combined by use of a dichroic element. For transmission and reflection microscopy, a second reference can be added perpendicular to the represented one in FIG. 4. In this last case, the two light sources can have the same wavelength to provide simultaneous reflection and absorption contrasts with a single acquisition.

Implementations comprising 2 reference waves, as in FIGS. 5 and 6, or as described in the paragraphs just before for others implementations, can be used also for polarization and birefringence measurements, by defining two crossed polarizations for the two reference waves. In this case a single light source is sufficient, or two identical light sources can be used.

Optionally as shown in the setup of FIG. 6, at least on fiber splitter (FSa) and/or (FSb) which can comprise at least one additional entrant fiber, connected to at least one additional light source (1c) and/or (1d). In this case, switching on one light source per fiber splitter enables to generate up to four different dual-wavelength combinations. Even more light sources can be added by cascading additional fiber couplers or by using multiplexers. Wavelength tunable light sources can also be used to broaden the range of achievable wavelengths combinations. Such fiber-based multiplexing possibilities enabling to combine several light sources to same instrument can also be applied to all other presented implementations, including setups with a single reference wave were dual wavelength measurements can be achieved sequentially. Such multi-source implementations would be much more complex to manage without fiber optics couplers and splitters, and illustrate once again the benefits of using fiber splitter devices according to present invention.

Methods using interferometric or holographic apparatuses including and making use of fiber splitter devices according to present invention process digital holograms or interferograms provided by the image sensor (9) in order to reconstruct intensity and/or quantitative phase contrast images describing the sample 5. Digital holography methods as described for example in patents EP1119798 or U.S. Pat. No. 7,649,160 will be preferred to reconstruct off axis digital holograms recorded with out-of-focus object contributions. Off-axis, in-focus interferograms or interference patterns can be processed by use of fringe analysis or fringe processing methods, such as Fourier fringe pattern analysis, and in-line interference patterns or holograms using phase-shifting techniques. Vertical scanning interferometry methods can also be applied to process in-line or off-axis image stacks recorded while translating the sample vertically and/or while scanning a given range of reference free-space OPL. The list of methods in this paragraph is not exhaustive and cannot represent a limitation of the scope of present invention, since holograms or interference patterns obtained using apparatus making use of fiber splitter devices according to present invention can be reconstructed by other equivalent methods providing similar results, or can even not be reconstructed at all if not required by the concerned application.

Fiber splitter devices FSD according to present invention are also useful to adapt holographic or interferometric apparatuses so that these apparatuses can be used to perform three-dimensional (3D) tomographic imaging, or optical diffraction tomographic imaging. The general principle of such a modification enabling tomographic imaging is that the end of the object fiber (E3) can be positioned in the setup so that the sample (5) is obliquely illuminated to provide a so-called angular projection, and that several different angular projections of the sample (5) can be generated by moving the object fiber end (E3) in the setup, in order to generate different illumination angles.

Figure 7:
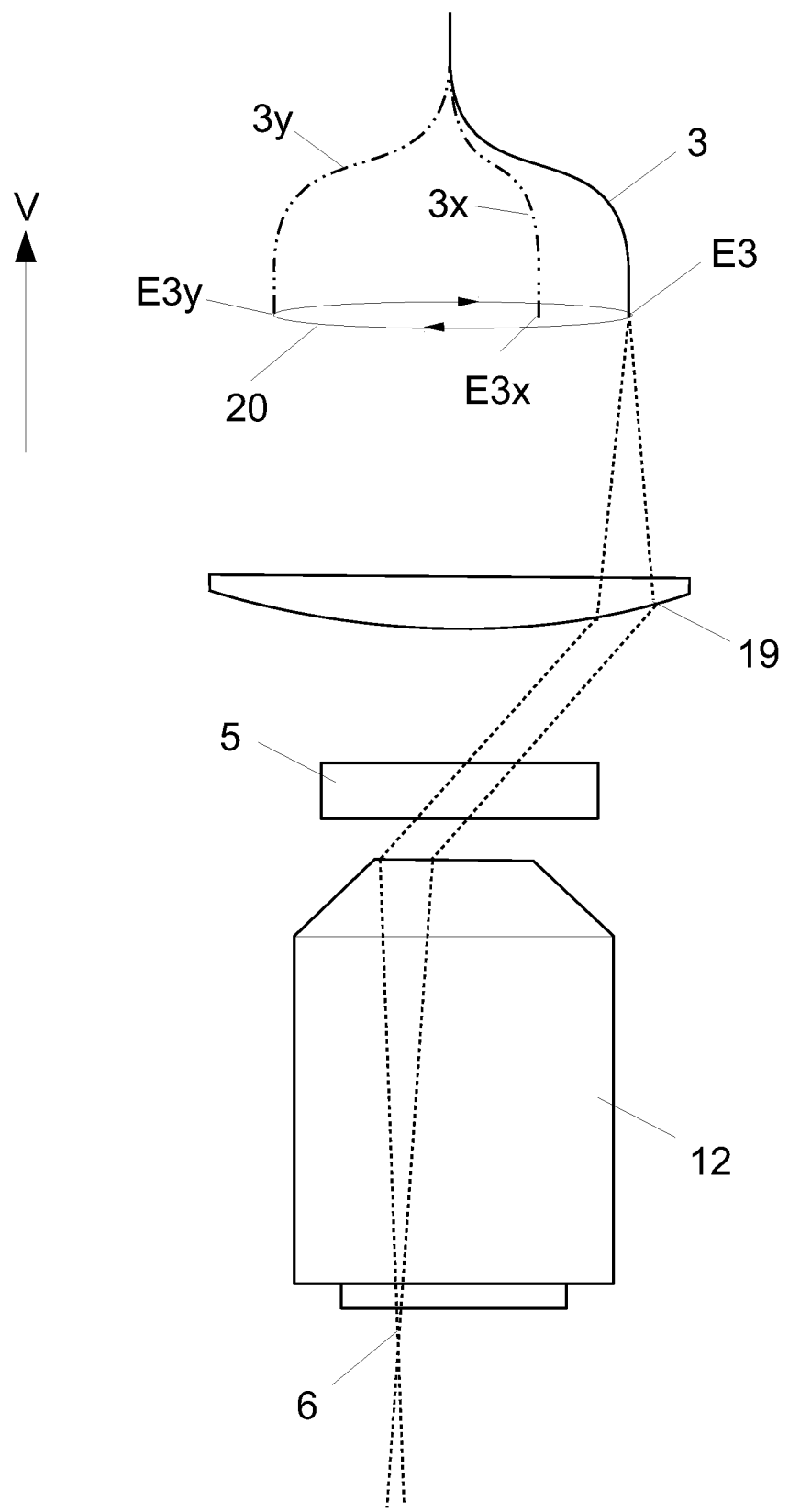
FIG. 7 depicts an exemplary modification of the implementation of FIG. 3 to adapt apparatus making use of a fiber splitter device according to present invention for tomographic imaging by collection of several angular projections across a sample volume.

In FIG. 7, an adaptation of the implementation described by FIG. 3 is presented, which enables three-dimensional (3D) tomographic imaging by use of transmission holographic or interferometric microscopy setup. The adaptation described by FIG. 7 shows a modified arrangement of sub-ensemble CC in FIG. 3, composed of an object fiber (3) with its end E3, a lens called condenser lens or condenser (19), a sample (5) and an objective (12). In FIG. 3 all these elements are static and centered on the same vertical axis. In FIG. 7, the end of the object fiber (E3) is not axially centered with respect to the center of the objective (12), and is no more static but rotating along a circle (20) in the back focal plane of the condenser (19), at a radial distance (rotation circle radius) approaching (or substantially equally to) the condenser lens radius. As a result, as shown in FIG. 7, the sample volume (5) is illuminated obliquely and the microscope objective (12) collects a so-called angular projection, later serving as an object wave (6) to create a hologram or an interferogram, and as the fiber end (E3) rotates along circle (20), several holograms or interferograms corresponding to different angular projections (or to different illumination angles) can be recorded by the image sensor (9), and a 3D tomographic image of the sample volume (5), can be obtained by combining the information reconstructed from these different holograms or interferograms Of course, an adaptation for tomographic imaging as described in FIG. 7 implies that a fiber end displacement stage, such as a motorized rotation stage, is included in the holographic or interferometric setup to rotate the fiber end E3. As well, it implies to that image sensor (9) and fiber end displacement stage are synchronized so that holograms or interferograms are acquired at defined angular intervals.

Interestingly, this tomographic image can be quantitative and provides the 3D distribution of the refractive index in the sample volume (5).

Tomographic images can also be collected in reflection by rotating the end E3 of an object fiber 3, optionally together with a collimating optic, in a plane defined so that a nearly focused light spot rotates close to the back focal plane of the objective 12 itself.

The condenser lens (19) of FIG. 7 can also be removed and oblique illumination generated by tilting the end E4 of the object fiber 3, enabling for example the collection of angular projections in a lensless configuration.

As well, motions other than rotations can be applied to the end E3 of the object fiber (3), and the back focal plane (20) of the condenser lens (19) can be scanned trough linear translations, or trough more complex trajectories, such as elliptic or spiral trajectories.

The advantages of using a fiber splitter device FSD according to present invention are the same as for the corresponding microscopy or imaging configurations, but with an important supplemental advantage compared to other tomographic implementations, because fiber delivery by use of an object wave fiber (3) enables to bring a point source directly to and to be placed on the rotating part of the setup, while several reflections carefully aligned to each other are required in an equivalent free-space implementation.

Moreover, in a further embodiment, as schematically shown in FIG. 7 with added dashed and doted lines, splitting the object fiber (3) to provide a plurality of additional object fibers 3x, 3y enables to add at least one additional illumination angle by placing the end E3x, E3y of at least one additional object fiber at a least one additional angular and/or radial or and/or axial position, thus adding at least one more angular projection simultaneously available, enabling to reduce the rotation required for a full angular. A plurality of illumination angles is achieved by placing the plurality of ends E3x, E3y of the additional object fibers 3x, 3y at additional angular and/or radial or and/or axial positions. Interestingly, as fiber splitters can be realized with up to more than one hundred exiting fibers, all required angular projections can be realized without rotation and the system instead includes a fiber holder or holders for positioning the plurality of object fibers 3, 3x, 3y relative to the lens 19. Instead of splitting the object fiber (3), additional angular projections can be added also by duplicating the fiber splitter device FSD according to present invention, and optionally also duplicating the light source.

Interestingly, in another embodiment, one of the added angular projections (object fibers 3, 3x, 3y) is centered on, and parallel to the optical axis of the objective 12, enabling simple transfer between a tomographic imaging mode, and a standard microscopy mode.

Finally, it's important to specify that the present invention describes a fiber splitter device FSD of general use for building interferometric or holographic apparatus. The exemplary implementations described herein are not intended to limit the scope of the invention, but are provided to show exemplary embodiments and to illustrate relevant advantages of the invention in particular situations.

While the invention has been disclosed with reference to certain preferred embodiments, numerous modifications, alterations, and changes to the described embodiments, and equivalents thereof, are possible without departing from the sphere and scope of the invention. Accordingly, it is intended that the invention not be limited to the described embodiments, and be given the broadest reasonable interpretation in accordance with the language of the appended claims.

REFERENCES

Björn Kemper, Daniel Carl, Alexander Höink, Gert von Bally, Ilona Bredebusch, Jürgen Schnekenburger, Modular digital holographic microscopy system for marker free quantitative phase contrast imaging of living cells, Proc. of SPIE Vol. 6191, 61910T, (2006).
Qu Weijuan, Chee Oi Choo, Yu Yingjie and Anand Asundi, Microlens characterization by digital holographic microscopy with physical spherical phase compensation, APPLIED OPTICS, Vol. 49, No. 33, p. 6448 (2010).
Jonas Kühn, Tristan Colomb, Frédéric Montfort, Florian Charrière, Yves Emery, Etienne Cuche, Pierre Marquet and Christian Depeursinge, Real-time dual-wavelength digital holographic microscopy with a single hologram acquisition, OPTICS EXPRESS, Vol. 15, No. 12, p. 7231 (2007).

The invention claimed is:

1. An optical system including:
at least one fiber splitter device comprising a first optical fiber for propagating an electromagnetic wave to a first output fiber end, and a second optical fiber for propagating an electromagnetic wave to a second output fiber end;
an optical device configured to generate an optical interference between (i) at least one object electromagnetic wave generated by interaction of an electromagnetic wave emitted from the first fiber output end with a sample, and (ii) at least one reference electromagnetic wave provided by the second fiber output end;
wherein the first optical fiber and the second optical fiber have different fiber lengths; or the same fiber length where the first optical fiber includes a light propagating material having a different refractive index to that of a light propagating material of the second optical fiber.

2. The optical system according to claim 1, wherein the first fiber and the second fiber of the fiber splitter device have a fiber length difference defined as a length difference between the first and second optical fibers exiting from a fiber splitter of said fiber splitter device, and wherein said fiber length difference is defined in order to enable optimal interference conditions.

3. The optical system according to claim 2, wherein said optimal interference conditions means that said fiber length difference is fixed in order to define identical optical path lengths for both the reference wave and the object wave interfering.

4. The optical system according to claim 2, wherein said optimal interference conditions means that said fiber length difference is defined in order to satisfy a wavefront matching condition for an interference occurring between the reference wave and the object wave.

5. The optical system according to claim 1, wherein the optical system is a holographic or interferometric imaging system.

6. The optical system according to claim 1, wherein:
the at least one fiber splitter device is configured to split light from a light source into the first object optical fiber and into the second optical reference fiber;
the optical system further comprising:
an image sensor for recording holograms or interference patterns or interferograms produced by interference between the at least one object wave and the at least one reference wave, and wherein a fiber length difference characterizes a length difference between the at least one reference fiber and the at least one object fiber.

7. The optical system according to claim 6 wherein the at least one object wave is produced by a first optical system situated between said image sensor and an end of the at least one object fiber, and wherein said first optical system is configured to produce an image of said sample, said image being a magnified image of said sample, or a reduced size image of said sample, said image being focused or not focused on said image sensor.

8. The optical system according to claim 6 the at least one reference wave is produced by a second optical system situated between said image sensor and the end of the at least one reference fiber, and wherein said second optical system defines off-axis or inline interference conditions in which the at least one reference wave propagates respectively with an angle or parallel with respect to the at least one object wave.

9. The optical system according to claim 6 comprising at least two light sources coupled to at least two different fiber splitter devices, or coupled to a same fiber splitter device comprising a plurality of entrant fibers.

10. The optical system according to claim 6 comprising at least two fiber splitter devices cascaded to each other, wherein at least one fiber splitter device splits at least one fiber exiting from another fiber splitter device.

11. The optical system according to claim 6 comprising at least one fiber coupler comprising at least two entrant fibers and at least one exiting fiber, said fiber coupler being used to combine two light sources, or being used to combine a light source and a fiber, or being used to combine two fibers.

12. The optical system according to claim 6 comprising at least two different reference waves corresponding to different wavelengths and/or polarization states.

13. The optical system according to claim 6 comprising at least two different object waves corresponding to different wavelengths and/or polarization states and/or sample illumination directions, and wherein sample illumination directions comprise at least transmission illumination or reflection illumination.

14. The optical system according to claim 1, further comprising:
a sample for reflecting or transmitting the light delivered by the at least one object fiber to create at least one object wave, and
the at least one reference wave generated from the light delivered by the at least one reference fiber.

15. The optical system according to claim 1 wherein the end of the at least one object fiber is positioned so that said object wave is an angular projection of said sample, and wherein the system further includes displacement means to move the end of said object fiber to acquire several different angular projections of said sample volume; and/or the system including additional object fibers whose ends are located at different positions.

16. A holographic or interferometric device including:
a fiber splitter comprising at least one input optical fiber, a first output optical fiber for propagating an electromagnetic wave to a first output fiber end, and a second output optical fiber for propagating an electromagnetic wave to a second output fiber end;
wherein the first output optical fiber and the second output optical fiber have different fiber lengths; or the same fiber length where the first output optical fiber includes a light propagating material having a different refractive index to that of a light propagating material of the second output optical fiber.

17. The holographic or interferometric device according to claim 16 wherein the first fiber and the second fiber have a fiber length difference defined as a length difference between the first and second optical fibers exiting from said fiber splitter, and wherein said fiber length difference is defined in order to enable optimal interference conditions.

18. The holographic or interferometric device according to claim 17, wherein said optimal interference conditions means that said fiber length difference is fixed in order to define identical optical path lengths for both the reference wave and the object wave interfering.

19. The holographic or interferometric device according to claim 17, wherein said optimal interference conditions mean that said fiber length difference is defined in order to satisfy a wavefront matching condition for an interference occurring between the reference wave and the object wave.

* * * * *